United States Patent
North et al.

(10) Patent No.: US 10,061,332 B2
(45) Date of Patent: Aug. 28, 2018

(54) ACTIVE ACOUSTIC CONTROL OF COOLING FAN AND METHOD THEREFOR

(71) Applicant: Dell Products, LP, Round Rock, TX (US)

(72) Inventors: Travis C. North, Cedar Park, TX (US); Arnold T. Schnell, Pflugerville, TX (US)

(73) Assignee: Dell Products, LP, Round Rock, TX (US)

( * ) Notice: Subject to any disclaimer, the term of this patent is extended or adjusted under 35 U.S.C. 154(b) by 58 days.

(21) Appl. No.: 14/330,776

(22) Filed: Jul. 14, 2014

(65) Prior Publication Data

US 2016/0013745 A1    Jan. 14, 2016

(51) Int. Cl.
| | |
|---|---|
| *H03B 29/00* | (2006.01) |
| *G05D 23/19* | (2006.01) |
| *H02P 7/29* | (2016.01) |
| *G06F 1/16* | (2006.01) |
| *G06F 1/20* | (2006.01) |

(52) U.S. Cl.
CPC ....... *G05D 23/1927* (2013.01); *G06F 1/1684* (2013.01); *G06F 1/203* (2013.01); *G06F 1/206* (2013.01); *H02P 7/2913* (2013.01); *H02P 2205/07* (2013.01)

(58) Field of Classification Search
CPC ........... G05B 2219/37332; G05B 2219/37337; G05B 11/01
USPC ....................................... 381/71.5
See application file for complete search history.

(56) References Cited

U.S. PATENT DOCUMENTS

| | | | | |
|---|---|---|---|---|
| 7,158,644 B2 * | 1/2007 | Kakuhari | ............. | G10K 11/178 381/71.5 |
| 7,282,873 B2 * | 10/2007 | Abali | .................... | F04D 29/665 318/268 |
| 7,347,167 B2 * | 3/2008 | Sugiyama | ............... | F01P 7/048 123/41.11 |
| 7,941,231 B1 * | 5/2011 | Dunn | ...................... | G06F 1/203 361/695 |
| 8,368,329 B1 | 2/2013 | Depew et al. | | |
| 8,606,428 B2 | 12/2013 | Chan | | |
| 8,855,329 B2 * | 10/2014 | Slapak | .................... | F24F 13/24 181/201 |
| 2008/0259563 A1 * | 10/2008 | Fukuda | ................... | G06F 1/182 361/695 |
| 2009/0002939 A1 * | 1/2009 | Baugh | ..................... | G06F 1/206 361/679.48 |
| 2010/0024555 A1 * | 2/2010 | Gross | ................. | G01N 29/4427 73/579 |
| 2012/0150469 A1 * | 6/2012 | Welter | .................. | F04D 27/001 702/77 |
| 2013/0015801 A1 * | 1/2013 | Ady | ..................... | G11B 33/144 318/460 |
| 2013/0037620 A1 * | 2/2013 | Aryanfar | ................. | G06F 1/206 236/49.3 |

(Continued)

*Primary Examiner* — Bickey Dhakal
(74) *Attorney, Agent, or Firm* — Larson Newman, LLP

(57) ABSTRACT

An initial operating speed of a cooling fan at an information handling system is determined. A microphone is located at the system to favor acquisition of ambient sound relative to acquisition of sound emanating from the cooling fan. An audio signal is received from the microphone. The operating speed of the cooling fan is adjusted based on a level of the audio signal.

16 Claims, 6 Drawing Sheets

(56) References Cited

U.S. PATENT DOCUMENTS

2014/0094973 A1* 4/2014 Giaimo, III .............. G01H 3/10
                                                                          700/280

* cited by examiner

ACTIVE ACOUSTIC CONTROL OF COOLING FAN AND METHOD THEREFOR

FIELD OF THE DISCLOSURE

This disclosure generally relates to information handling systems, and more particularly relates to active acoustic control of a cooling fan at an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
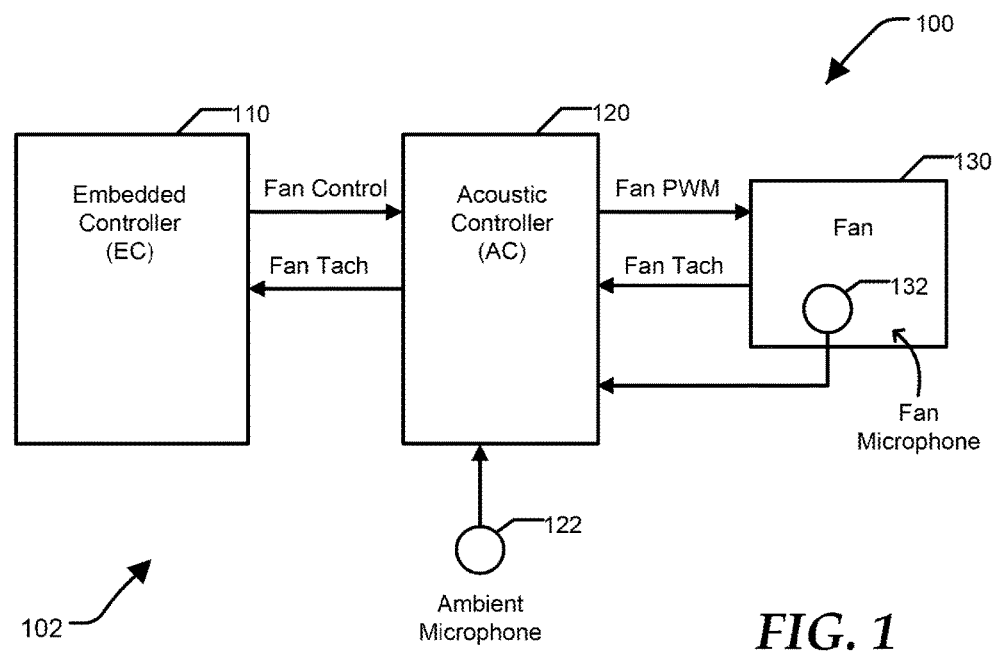
FIG. 1 is a block diagram illustrating a cooling system of an information handling system according to a specific embodiment of the present disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

As information handling systems are increasingly found in our personal and work environments, there is a desire to minimize noise generated by the systems. High performance systems can generate considerable heat, which often requires active cooling devices, such as fans, to move warm air away from processors and other system components. Specifications governing operation of an information handling system can place an upper limit on noise generation. Accordingly, manufacturers must design the information handling system to adhere to these specifications across a wide range of environmental conditions and in view of components variations. For example, variations in fan components may cause a small number of fans to produce a higher than average level of noise. In order for every system to achieve specified noise limits, the manufacturer may design all systems based on a worst-case analysis, taking the noisy fan into consideration. FIGS. 1-7 illustrate techniques for dynamically controlling system fans based on a real-time analysis of noise levels experienced during system operation and based on other criteria.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router, wireless router, or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

FIG. 1 shows a cooling system 100 installed within a chassis 102 of an information handling system according to a specific embodiment of the present disclosure. For example, the information handling system can be a lap-top computer, a desktop computer, a server, or another type of system that includes an audible cooling device. Cooling system 100 includes an embedded controller 110, an acoustic controller 120, and a fan 130. Cooling system 100 also includes an ambient microphone 122 and a fan microphone 132 that are coupled to the acoustic controller 120. The fan microphone 132 can be located proximate to the fan 130, and the ambient microphone 122 can be located at the information handling system remote from the fan 130 so as to minimize the amount of fan noise that it receives from the system while maximizing the amount of noise measured from the ambient environment. For example, the fan microphone 132 can be incorporated into the fan 130 assembly or positioned at a vent structure at the rear of the system 100, while the ambient microphone 122 can be located at the front of the system.

The embedded controller (EC) 110 can include a microcomputer or another type of processor. EC 100 may be referred to as a system management controller (SMC), a baseband management controller (BMC), or the like. EC 110 is responsible for performing various background tasks at the system 100. One such task can include control of system cooling devices. For example, EC 110 can initiate operation of fan 130 prior to activating a central processing unit (not shown at FIG. 1) of the system, or can regulate the speed of fan 130 in response to system temperature. The operating speed of fan 130 can be controlled using pulse-width-modulation (PWM). For example, a duty cycle of a supply voltage provided to fan 130, labeled Fan PWM at FIG. 1, can determine the speed of fan 130. During operation of system 100, the EC 110 can provide fan control information to the acoustic controller (AC) 120, the fan control information identifying an initial speed at which to operate the fan. In response to the fan control information, AC 120 can configure signal Fan PWM to operate at the desired speed. AC 120 can control the duty cycle of the signal FAN PWM to regulate the operating speed of fan 130. Fan 130 can include an output for providing a signal indicating the present speed of the fan, labeled Fan Tach at FIG. 1. The fan speed information can be provided to AC 120 and to EC 110.

AC 120 can include a signal processor for analyzing the signal received from the fan microphone 132 and the ambient microphone 122. For example, noise having high-frequency components may be perceived by the human ear as being louder than noise made up of predominately lower frequencies. Accordingly, AC 120 can determine a spectrum of frequencies present in the signal received from fan microphone 130 and determine a weighted loudness of the noise based on frequency information provided by the signal processor. AC 120 can take other considerations into account when determining an operating speed of fan 130. For example, a small increase in cooling can result in lower power dissipation of integrated circuits included at the information handling system, thereby lowering heat generated by these circuits. For another example, a small increase in fan speed can lower operating temperatures at system 200, which can improve reliability and increase the duration of turbo operation, where a clock rate of a central processing unit is momentarily increased to provide greater computational performance.

In one embodiment, AC 120 and fan microphone 132 can be omitted. For example, EC 110 can include an input for receiving a signal from the ambient microphone 122. During operation, EC 110 can determine a level of ambient noise. If the level of ambient noise exceeds a defined threshold, EC 110 can increase the speed of fan 130, because an increase in noise generated by the fan can be masked by the ambient noise. In another embodiment, fan microphone 132 can be omitted and noise produced by the fan 130 can be estimated based on a current fan speed. For example, a relationship between fan speed and fan noise can be characterized at the factory and the characterization information can be stored at a memory device at the information handling system 200. In another embodiment, the operating speed of fan 130 can be set so that the sound level detected by microphone 122 exceeds a specified maximum sound level in response to determining that sound level override indicator 124 is asserted.

Figure 2:
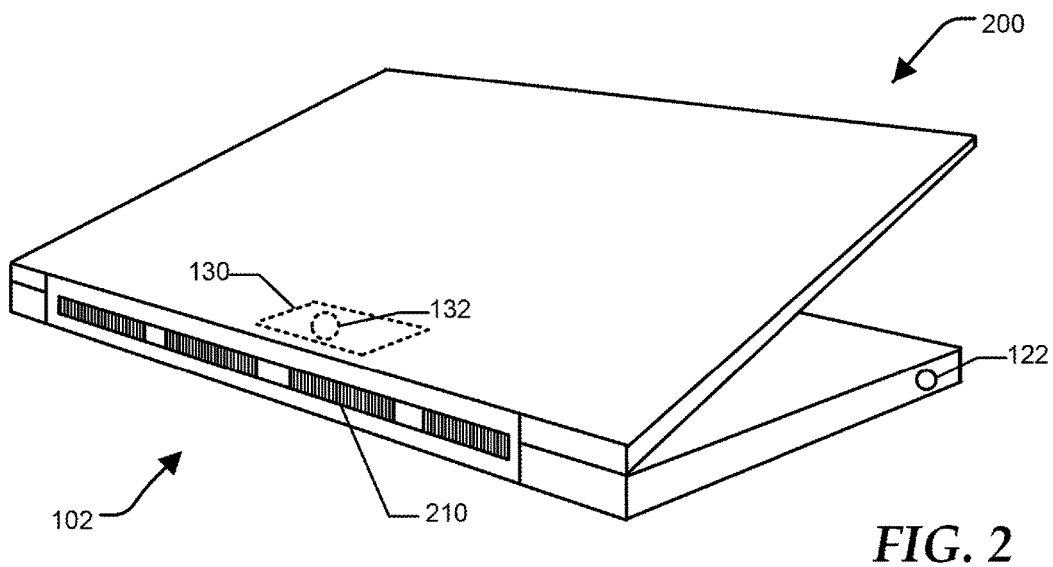
FIG. 2 is a perspective diagram illustrating an information handling system according to an embodiment of the present disclosure.

FIG. 2 shows an information handling system 200 according to an embodiment of the present disclosure. The information handling system 200 includes fan 130, fan microphone 132, and ambient microphone 122 described above with reference to FIG. 1. Fan 130 can be located inside and to the rear of system 200, operable to expel warm exhaust air at a vent 210. In one embodiment, fan 132 can be integrated into the vent 210. The ambient microphone 122 is preferably located far from the fan 130 and vent 210 because it is desired that ambient microphone 122 determine a sound level present in the environment around the system 200. For example, ambient microphone 122 can determine that crowd noise, industrial noise, loud music, and the like is present in the same area as the system 200. In a loud environment, cooling system 100 can be configured to allow fan 130 to operate at a higher speed than normal because the noise produced by the fan 130 will be masked by the high level of ambient noise. In contrast, a quiet environment may necessitate limiting the speed of fan 130 because excessive fan noise can be objectionable when there is little ambient noise.

In one embodiment of the present disclosure, the operating speed of fan 130 can be determined based on a sound level indicated by the fan microphone 132. In another embodiment, cooling system 100 can adjust the speed of fan 130 based on a sound level detected by the fan microphone 132 and based on a sound level detected by the ambient microphone 132. For example, cooling system 100 can adjust the speed of fan 130 based on a difference between sound levels detected by microphones 122 and 132. In another embodiment, cooling system 100 can be configured to exceed product specifications relating to system noise if a high level of ambient noise is detected. In still another embodiment, cooling system 100 can be configured, such as by a user, to exceed product specified noise limits, such as by asserting sound level override indicator 124. For example, a user may desire maximum computational performance from the information handling system, even if doing so requires increased cooling, and associated elevated fan noise. In another embodiment, AC 120 can adjust the speed of fan 130 to minimize resonance of fan 130 based on sound levels indicated by fan microphone 132. For example, AC 120 can utilize sound level information provided by fan microphone 132 to determine that fan 130 exhibits resonance at a particular fan speed, resulting in increased noise levels at that speed. Similarly, components or materials making up the chassis or exhaust vent of the information handling system 200 may vibrate due to resonance when fan 130 operates at a particular speed. In response, AC 120 can either decrease or perhaps increase the speed of the fan to avoid operating at the particular speed that causes sympathetic resonance.

Figure 3:
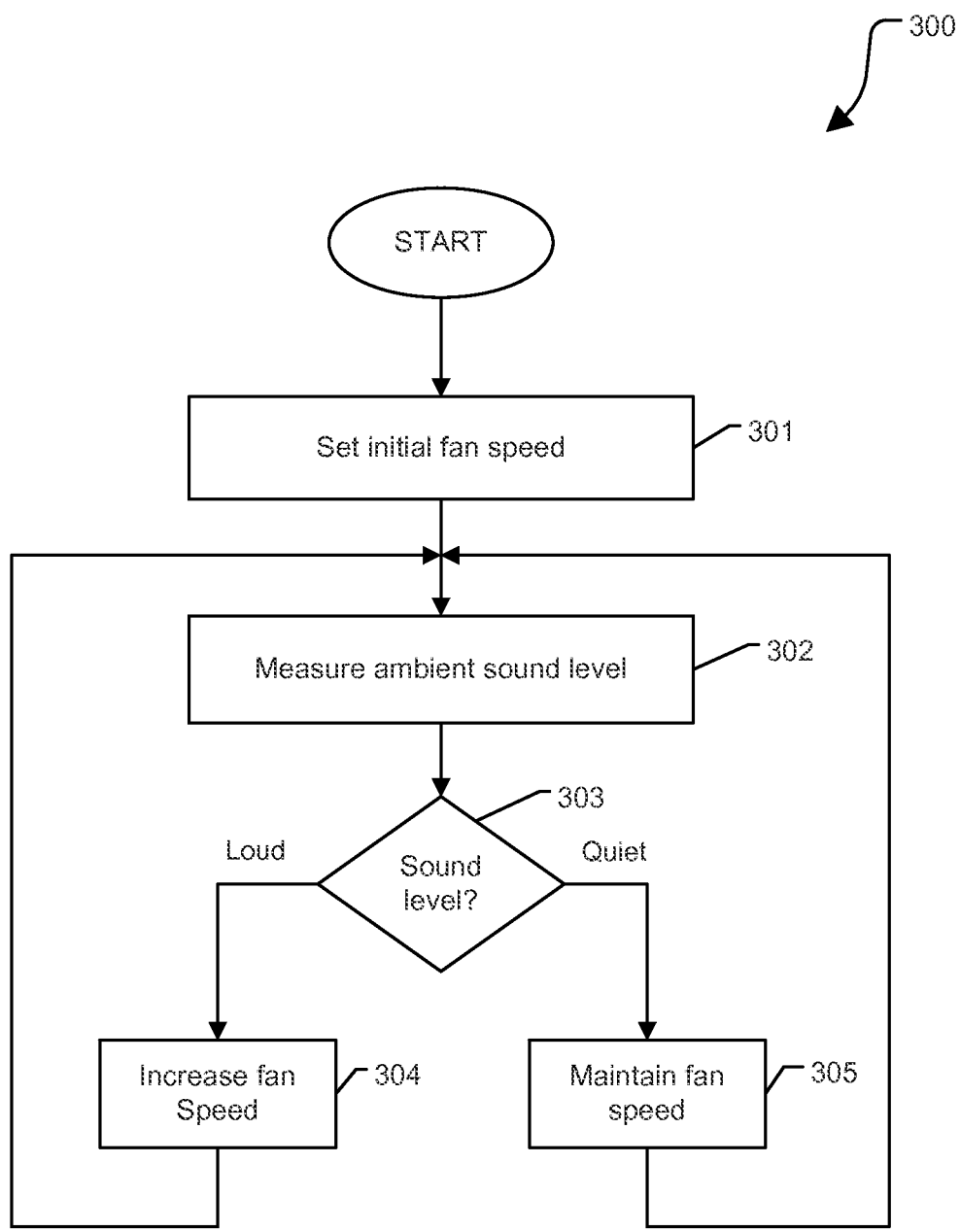
FIG. 3 is a flow diagram illustrating a method for operating the cooling system of FIG. 1 according to a specific embodiment of the present disclosure.

FIG. 3 shows a method 300 for operating the cooling system 100 of FIG. 1 according to a specific embodiment of the present disclosure. The method begins at block 301 where a fan is initialized to a desired speed. For example, EC 110 can provide signal Fan Control to AC 120, the signal specifying the desired speed. AC 120 can generate signal Fan PWM having a duty cycle corresponding to the desired fan speed. The method continues at block 302 where an ambient sound level is measured. For example, ambient microphone 122 is configured to measure a sound or noise level in a work environment, indicative of sound levels being experienced by a user of information handling system 200. The method continues at the decision block 303 where it is determined whether the sound level measured at block 302 exceeds or is below a defined level. If the ambient sound level is greater than the defined threshold, the method continues at block 304 where the speed of the cooling fan 130 can be increased. The operating speed of the cooling fan 130 can be increased because the high level of ambient noise will mask any additional noise generated b the cooling fan. However, if the ambient sound level is below the defined threshold, the method continues at block 305 where the speed of the cooling fan can be maintained at the present speed. In either case, the method returns to block 302 where the sound level at the fan is again measured.

In another embodiment, AC 120 can control fan 130 autonomously, without receiving fan control directives from EC 110. For example, EC 110 can be configured to access fan status information from AC 120. In another embodiment, AC 120 can decrease the speed of the cooling fan 130 if a sound level measured at the fan microphone 132 exceeds a maximum noise level provided by a specification of the information handling system 200. Although systems are designed to meet maximum advertised performance while also remaining below-maximum acoustic levels, decreasing the fan speed below the level requested by the EC 110 can still be done but may cause the system to throttle, which lowers system performance.

In an embodiment, cooling system 100 can increase the speed of fan 130 up to the point where the maximum sound level specification is reached, but not exceeded. In another embodiment, cooling system 100 can increase the fan speed only when the information handling system 200 is performing computations that warrant increased central processing unit (CPU) performance, which can necessitate additional cooling. For example, if the system 200 is idle or minimally loaded, the cooling system 100 can reduce the speed of fan 130 and thus reduce fan noise. If, however, the information handling system 200 is doing a large amount of work, the cooling system 100 can increase the speed of fan 130 until AC 120 determines that a further increase in fan speed will generate noise that exceeds specified maximum levels. As described above, the cooling system 100 can be configured to adjust the speed of fan 130 based on sound levels provided by ambient microphone 122. For example, cooling system 100 can be configured by a user to exceed a specified maximum noise level. For example, a basic input/output system (BIOS), a runtime process, an application program, or the like, can provide an interface through which a user can configure the operation of the cooling system 100.

Human perception of loudness varies based on the frequency of a sound. Accordingly, signals received at ambient microphone 122 and at fan microphone 132 can be processed by AC 120 to determine the frequencies present in the sound, and provide an indication of loudness of the sound that takes frequency into consideration. International standards, such as IEC A-weighting, account for relative loudness, as perceived by the human ear, over a range of frequencies. For example, the human ear perceives sounds in the middle of the range of frequencies of human hearing as being louder than low frequencies and very high frequencies. A manufacturer can take this behavior into consideration when defining a maximum noise level of an information handling system.

Figure 4:
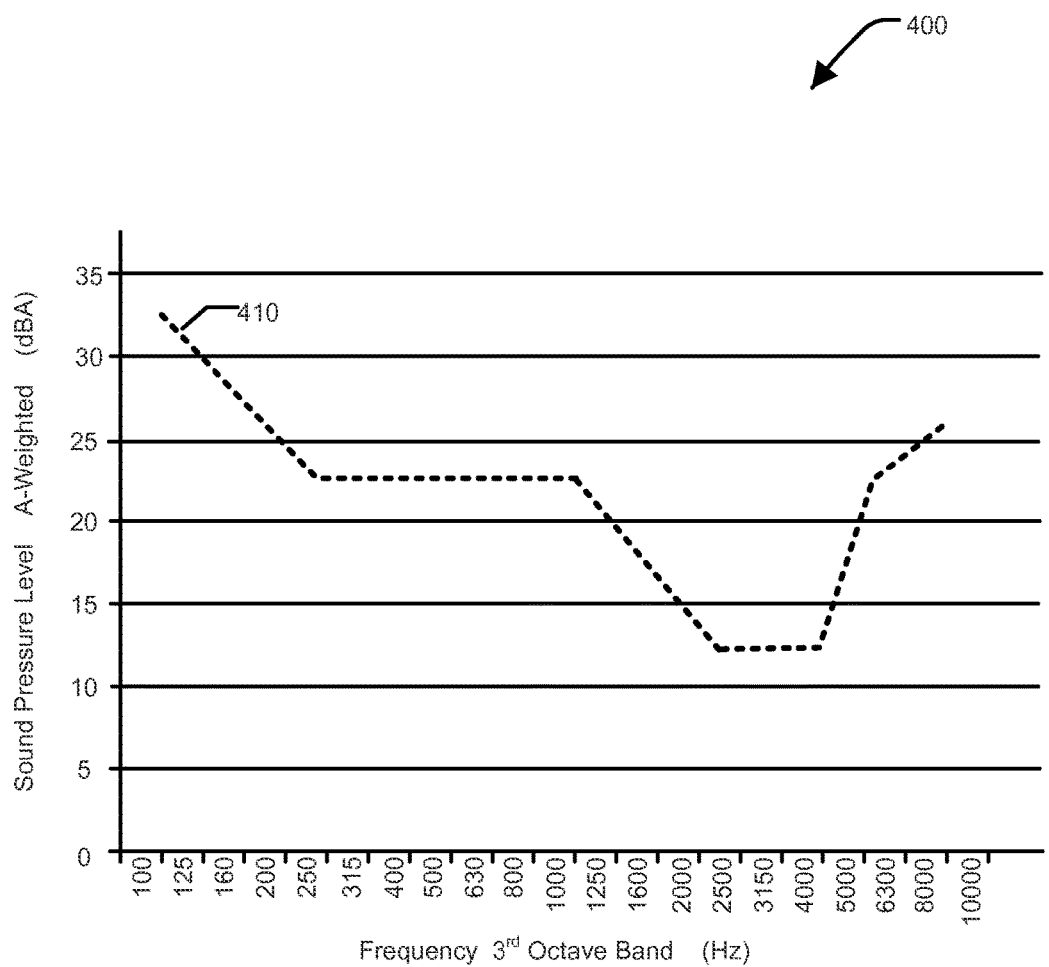
FIG. 4 is a graph illustrating maximum sound pressure levels as a function of frequency according to a specific embodiment of the present disclosure.

FIG. 4 shows a graph 400 illustrating maximum sound pressure levels as a function of frequency according to a specific embodiment of the present disclosure. The graph 400 includes a horizontal axis representing frequency in Hertz, a vertical axis representing sound pressure level in dBA, and a profile 410 representing a maximum acceptable sound pressure level at each of a range of frequencies. The horizontal axis is divided into one-third octave bands of frequencies. AC 120 can include a signal processor operable to perform a Fast Fourier Transform (FFT) on the signals received from the fan microphone 132 and the ambient microphone 122 to determine a spectral content of the noise signal. Noise at each frequency band can be compared with the profile 410 of graph 400 to determine whether information handling system is operating within specified noise levels.

Figure 5:
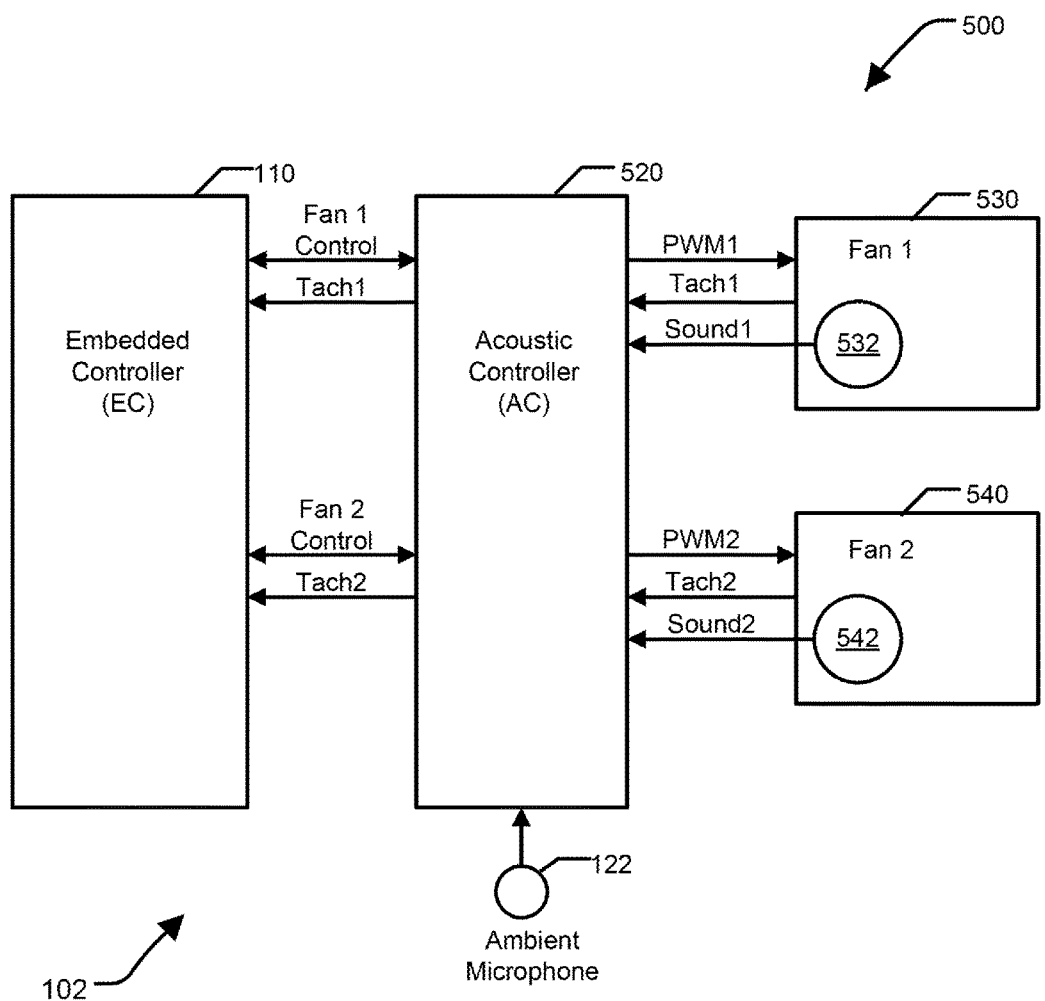
FIG. 5 is a block diagram illustrating a cooling system of an information handling system according to another embodiment of the present disclosure.

FIG. 5 shows a cooling system 500 of an information handling system according to another embodiment of the present disclosure. Cooling system 500 is similar to cooling system 100 of FIG. 1, except cooling system 500 includes two fans and two fan microphones. Cooling system 500 includes embedded controller 110, an acoustic controller 520, a fan 530, and a fan 540. Cooling system 500 also includes an ambient microphone 122, a fan microphone 532, and a fan microphone 542, each fan coupled to the acoustic controller 520. Fan microphone 532 can be integrated with fan 530 or otherwise proximate to fan 530. Similarly, fan microphone 542 can be in close proximity to fan 540, so that sound levels provided by each microphone are primarily indicative of a corresponding sound level of the associated fan. Operation of cooling system 500 is similar to the operation of cooling system 100 described above, except fans 530 and 540 can be independently controlled to regulate operating temperature and noise generated by the information handling system 200. For example, AC 520 can configure fan 530 and 540 to operate at different speeds. As described above, resonance associated with each fan can be individually minimized. Furthermore, because the fans are operating at different speeds, the corresponding frequency spectrum of fan noise associated with each fan can be different. The loudness of noise at similar frequencies may be perceived by the human ear as additive, so operating the fans at different speeds can result in different noise frequencies and thus lower perceived loudness.

Figure 6:
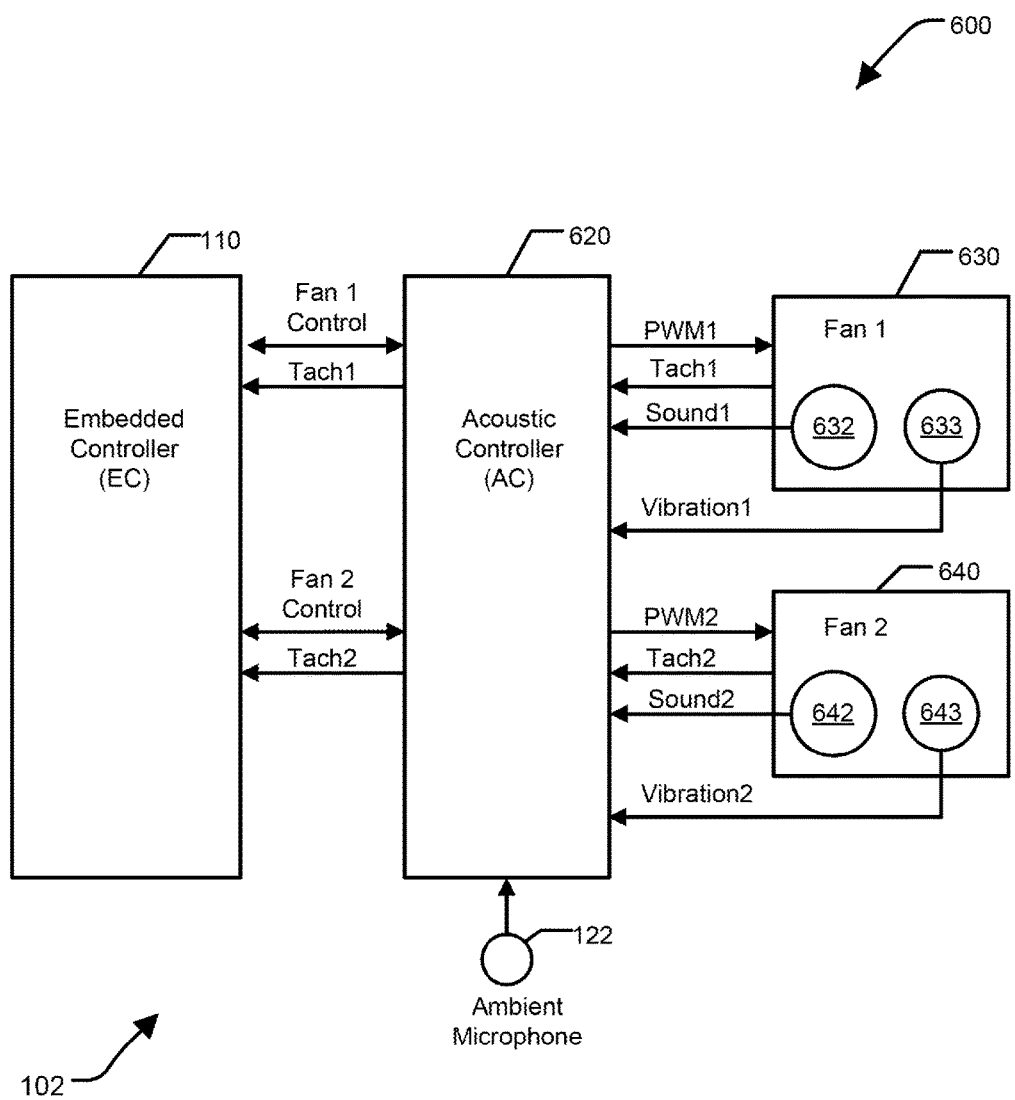
FIG. 6 is a block diagram illustrating a cooling system of an information handling system according to yet another embodiment of the present disclosure.

FIG. 6 shows a cooling system 600 of an information handling system according to yet another embodiment of the present disclosure. Cooling system 600 is similar to cooling system 500 of FIG. 1, except each of the fans also includes a vibration sensor. Cooling system 600 includes embedded controller 110, an acoustic controller 620, a fan 630, and a fan 640. Cooling system 600 also includes an ambient microphone 122, a fan microphone 632 and a fan vibration sensor 633 associated with fan 630, and a fan microphone 642 and a fan vibration sensor 643 associated with fan 640, each microphone and vibration sensor coupled to the acoustic controller 620. Fan microphone 632 can be integrated with fan 630 or otherwise proximate to fan 630. Similarly, fan microphone 642 can be in close proximity to fan 640. Vibration sensor 633 can be tightly coupled to the housing of fan 630, and vibration sensor 643 can be tightly coupled to the housing of fan 640. In another embodiment, a vibration sensor can also be located in other parts of the system 200, such as attached to a notebook palm rest assembly, to detect vibration and resonances that may contribute to the overall user experience.

Operation of cooling system 600 is similar to the operation of cooling system 500 described above. In addition, AC 620 can determine preferred speeds to operate fans 630 and 640 based on vibration intensity provided by the corresponding vibration sensors 633 and 643. For example, sympathetic vibration and resonance of components at information handling system 200 can be reduced by adjusting the speed of one or both fans based on vibration information provided by sensors 633 and 643. For another example, optimal fan speed, as determined based on noise and vibration, may change over time due to fan wear. Accordingly, AC 620 can adjust the speed of each fan to minimize vibration. While fan vibration may correlate with noise, there is also interest in reducing vibration felt by a user of information handling system 200. Therefore, AC 620 can identify optimal fan speeds to minimize noise and to minimize vibration, or to arrive at a compromised solution.

Figure 7:
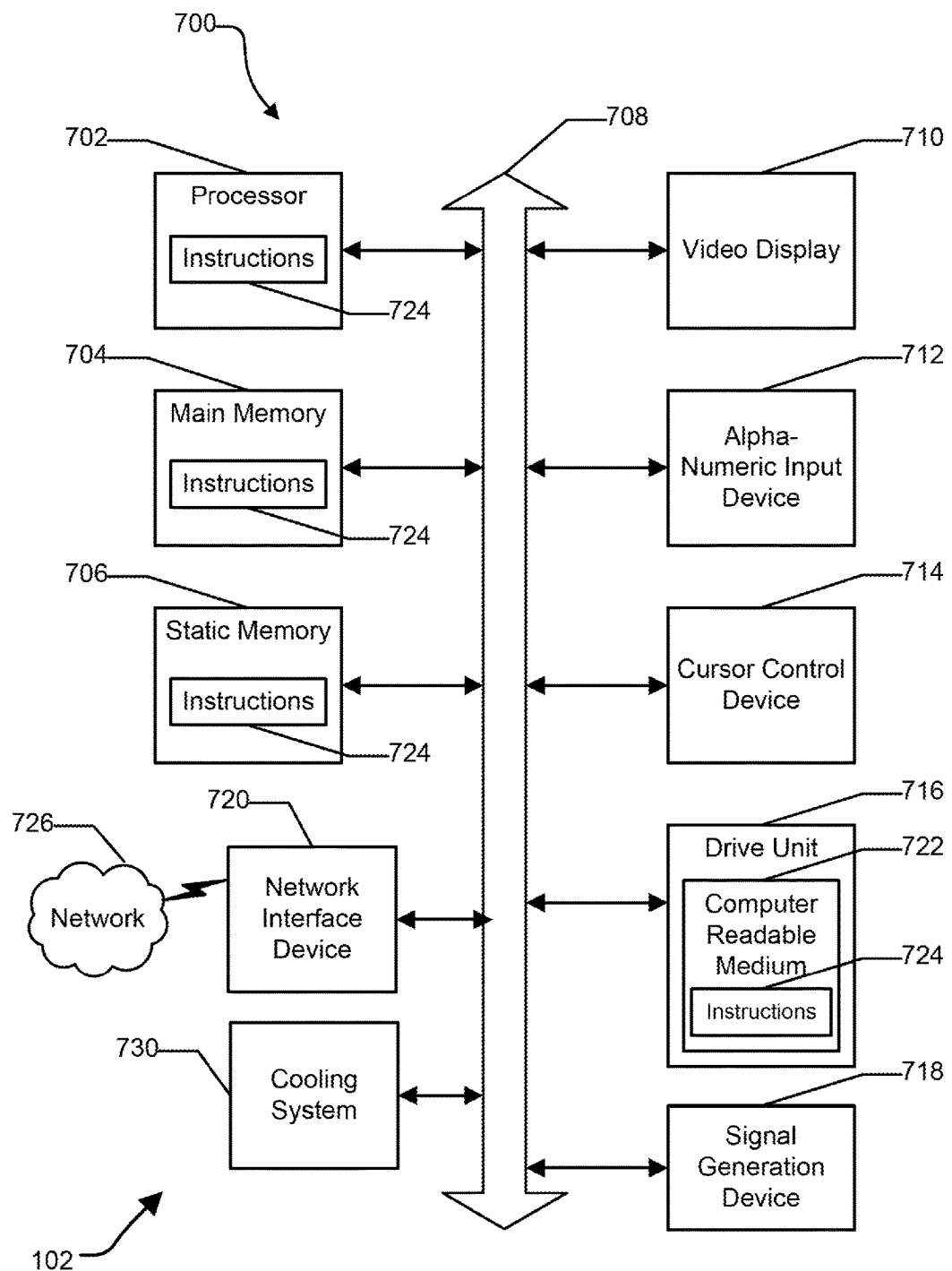
FIG. 7 is a block diagram of an information handling system according to an embodiment of the present disclosure.

FIG. 7 shows an information handling system 700 according to a specific embodiment of the present disclosure. The information handling system 700 may include a processor 702 such as a central processing unit (CPU), a graphics processing unit (GPU), or both. Moreover, the information handling system 700 can include a main memory 704 and a static memory 706 that can communicate with each other via a bus 708. As shown, the information handling system 700 may further include a video display unit 710, such as a liquid crystal display (LCD), an organic light emitting diode (OLED), a flat panel display, a solid state display, or a cathode ray tube (CRT). Additionally, the information handling system 700 may include an input device 712, such as a keyboard, and a cursor control device 714, such as a mouse. The information handling system 700 can also include a disk drive unit 716, a signal generation device 718, such as a speaker or remote control, and a network interface device 720 to provide communications over a network 726. Information handling system also includes a cooling system 730, which can include cooling systems 100, 500, 600, or the like.

The information handling system 700 can include a set of instructions that can be executed to cause the computer system to perform any one or more of the methods or computer based functions disclosed herein. The computer system 700 may operate as a standalone device or may be connected such as using a network, to other computer systems or peripheral devices.

In a networked deployment, the information handling system 700 may operate in the capacity of a server or as a client user computer in a server-client user network environment, or as a peer computer system in a peer-to-peer (or distributed) network environment. The information handling system 700 can also be implemented as or incorporated into various devices, such as a personal computer (PC), a tablet PC, a set-top box (STB), a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication, Further, while a single information handling system 700 is illustrated, the term "system" shall also be taken to include any collection of systems or sub-systems that individually or jointly execute a set, or multiple sets, of instructions to perform one or more computer functions.

The disk drive unit 716 may include a computer-readable medium 722 in which one or more sets of instructions 724 such as software can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the information handling system 700. The main memory 704 and the processor 702 also may include computer-readable media. The network interface device 720 can provide connectivity to a network 726, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal; so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    determining, by an information handling system, an initial value of an operating speed of a first cooling fan;
    receiving, by the information handling system, a first audio signal from a first microphone, the first microphone remotely installed within a chassis of the information handling system from the first cooling fan, the first audio signal representing an ambient sound external to the chassis;
    receiving, by the information handling system, a second audio signal from a second microphone installed within the chassis proximate to the first cooling fan, the second audio signal representing a sound of the first cooling fan;
    determining, by the information handling system, a spectral content associated with the first audio signal and with the second audio signal;
    comparing, by the information handling system, the spectral content to a profile of sound pressure levels according to frequency;
    determining, by the information handling system, that the spectral content is at or below a maximum sound pressure level according to the profile of the sound pressure levels; and
    increasing, by the information handling system, the operating speed of the first cooling fan so that a noise level remains below the maximum sound pressure level.

2. The method of claim 1, further comprising determining the frequency associated with the first audio signal.

3. The method of claim 1, further comprising decreasing the operating speed of the first cooling fan if the noise level exceeds the maximum sound pressure level.

4. The method of claim 1, further comprising:
    determining an operating speed of a second cooling fan installed within the chassis of the information handling system;
    receiving a third audio signal from a third microphone located within the chassis proximate to the second cooling fan; and
    adjusting the operating speed of the second cooling fan based on the noise level associated with the second cooling fan.

5. The method of claim 1, further comprising:
    receiving vibration intensity information from an electromechanical transducer incorporated at the information handling system; and
    adjusting the operating speed of the first cooling fan further based on the vibration intensity information.

6. An information handling system comprising:
    a first cooling fan operating within a chassis of the information handling system;
    a first microphone installed within the chassis proximate to the first cooling fan, the first microphone generating an ambient audio signal representing an ambient noise external to the chassis;
    a second microphone installed within the chassis remote from the first cooling fan, the second microphone generating a fan audio signal representing a fan noise associated with the first cooling fan operating within the chassis; and
    a fan control system operating within the chassis to adjust an operating speed of the first cooling fan based on a comparison of a spectral content associated with the ambient audio signal and with the fan audio signal to a profile of sound pressure levels according to frequency.

7. The information handling system of claim 6, wherein the fan control system increases the operating speed of the first cooling fan in response to the spectral content being below a maximum sound pressure level according to the profile of the sound pressure levels.

8. The information handling system of claim 6, wherein the fan control system decreases the operating speed of the first cooling fan in response to the spectral content being above a maximum sound pressure level according to the profile of the sound pressure levels.

9. The information handling system of claim 6, wherein the fan control system decreases the operating speed of the first cooling fan in response to a consumption of electrical power.

10. The information handling system of claim 6, further comprising:
    an electromechanical transducer incorporated at the information handling system;
    wherein the fan control system is further to adjust the operating speed of the first cooling fan based on vibration intensity information indicated by the electromechanical transducer.

11. The information handling system of claim 6, wherein the fan control system increases the operating speed of the first cooling fan.

12. The information handling system of claim 6, wherein the fan control system transforms the ambient audio signal into the noise level.

13. A fan control device at an information handling system, the fan control device comprising:
    a microcontroller;
    an output for providing a speed control signal to a first cooling fan operating within a chassis of the information handling system;
    a first input for receiving a fan audio signal from a first microphone located proximate to the first cooling fan;
    a second input for receiving an ambient audio signal from a second microphone operating within the chassis of the information handling system remote from the first cooling fan; and
    a signal processing unit coupled to the microcontroller, the signal processing unit to process the fan audio signal and the ambient audio signal to determine a spectral content,
    wherein the microcontroller is to:
        receive a profile specifying sound pressure levels according to frequencies;
        compare the spectral content to the profile specifying the sound pressure levels according to the frequencies; and adjust an operating speed of the first cooling fan based on a maximum sound pressure level indicated by the profile specifying the sound pressure levels according to the frequencies.

14. The fan control device of claim 13, wherein the microcontroller increases the operating speed of the first cooling fan in response to the spectral content being less than maximum sound pressure level indicated by the profile specifying the sound pressure levels according to the frequencies.

15. The fan control device of claim 13, wherein the microcontroller decreases the operating speed of the first cooling fan in response to the spectral content being greater than maximum sound pressure level indicated by the profile specifying the sound pressure levels according to the frequencies.

16. The fan control device of claim 13, further comprising:
   a third input for receiving vibration intensity information from an electromechanical transducer incorporated with the first cooling fan; and
   wherein the microcontroller further adjusts the operating speed of the first cooling fan based on the vibration intensity information.

* * * * *